(12) United States Patent
Erbe (10) Patent No.: US 10,634,902 B2
(45) Date of Patent: Apr. 28, 2020

(54) DEVICE FOR VARIABLY INFLUENCING THE WAVEFRONT OF A BEAM, SAID DEVICE COMPRISING A PLANAR OPTICAL ELEMENT DEFORMABLE VIA ITS REAR SURFACE

(71) Applicant: JENOPTIK Optical Systems GmbH, Jena (DE)

(72) Inventor: Torsten Erbe, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 91 days.

(21) Appl. No.: 16/049,443

(22) Filed: Jul. 30, 2018

(65) Prior Publication Data

US 2019/0041629 A1 Feb. 7, 2019

(30) Foreign Application Priority Data

Aug. 2, 2017 (DE) .................... 10 2017 117 465

(51) Int. Cl.
*G02B 26/08* (2006.01)
*G02B 7/185* (2006.01)

(52) U.S. Cl.
CPC ......... *G02B 26/0825* (2013.01); *G02B 7/185* (2013.01)

(58) Field of Classification Search
CPC ............................ G02B 7/185; G02B 26/0825
USPC ......................................................... 359/847
See application file for complete search history.

(56) References Cited

U.S. PATENT DOCUMENTS

| 1,685,032 | A | * | 9/1928 | Parsons | F21V 17/00 362/320 |
| 4,043,644 | A | * | 8/1977 | Humphrey | G02B 26/0825 359/846 |
| 4,059,346 | A | * | 11/1977 | Levine | G02B 26/0825 359/847 |
| 4,422,723 | A | * | 12/1983 | Williams, Jr. | G02B 26/0825 359/847 |
| 4,438,364 | A | * | 3/1984 | Morison | G02B 26/0825 310/328 |
| 5,291,337 | A | * | 3/1994 | Greger | G02B 5/10 359/846 |

(Continued)

FOREIGN PATENT DOCUMENTS

| DE | 19628672 C2 | 7/1999 |
| DE | 4236355 C2 | 11/2001 |

(Continued)

*Primary Examiner* — Ricky D Shafer
(74) *Attorney, Agent, or Firm* — Patentbar International, P.C.

(57) ABSTRACT

The invention relates to a device with a planar mirror (1), comprising a first axis of symmetry (A), and an actuating and holding means (10) with a frame (2), said frame (2) being firmly connected to the peripheral surface (1.3) of the planar mirror (1) and centrally contacting the rear surface (1.2) of the planar mirror (1). There is a socket (3), which is linearly adjustable along the axis of symmetry (A) in the frame (2) and is firmly connected, via a membrane spring (8), to the frame (2), on the one hand, and to a crown-like adjusting element (5), on the other hand. The crown-like adjusting element (5) has crown spikes which act on retaining lugs (6) connected to the planar mirror (1) and deform them, thereby applying forces corresponding to said deformation into the planar mirror (1) in order to deform the latter.

9 Claims, 5 Drawing Sheets

(56) References Cited

U.S. PATENT DOCUMENTS

| | | | |
|---|---|---|---|
| 6,425,671 B1* | 7/2002 | Adler | G02B 26/0825 359/846 |
| 7,229,178 B1 | 6/2007 | Headley et al. | |
| 9,829,702 B2* | 11/2017 | Erbe | G02B 26/0825 |
| 2006/0104596 A1* | 5/2006 | Askins | G02B 6/02133 385/147 |
| 2012/0275041 A1 | 11/2012 | Laslandes et al. | |
| 2019/0041632 A1* | 2/2019 | Erbe | G02B 27/0068 |
| 2019/0285834 A1* | 9/2019 | Erbe | G02B 7/182 |

FOREIGN PATENT DOCUMENTS

| | | |
|---|---|---|
| DE | 60116322 T2 | 6/2006 |
| DE | 102014208984 A1 | 10/2014 |
| EP | 0710551 B1 | 3/1997 |
| EP | 1118897 B1 | 12/2005 |

* cited by examiner

DEVICE FOR VARIABLY INFLUENCING THE WAVEFRONT OF A BEAM, SAID DEVICE COMPRISING A PLANAR OPTICAL ELEMENT DEFORMABLE VIA ITS REAR SURFACE

RELATED APPLICATIONS

This application claims priority to German Patent Application No. DE 10 2017 117 465.6, filed Aug. 2, 2017, which is incorporated herein by reference in its entirety.

FIELD OF THE INVENTION

The invention relates to a device comprising a planar mirror and an actuating and holding means, in which the planar mirror is held and its optically effective surface is actively deformable by actuation of an actuating element of the actuating and holding means. Using such a device, an impinging beam can be influenced so as to compensate for imaging errors (aberrations) of the beam, which are caused by one or more optical elements of an optical system and which can be detected, on the whole, as wavefront errors.

BACKGROUND OF THE INVENTION

Wavefront errors can be described and represented mathematically, for instance, by the so-called Zernike polynomials. They are detectable, for example, by wavefront aberrometers. In this case, the wavefront errors may be caused by individual imaging errors or by superposition of different imaging errors of single or multiple optical elements of an optical system. In many cases, individual optical elements have a dominant influence on the imaging errors of the system, and the wavefront deformation caused thereby has a typical appearance, which can be countered by active deformation of the surface of one of the optical elements or of a mirror additionally arranged in the system for this purpose.

In order to counter imaging errors, a large number of solutions are known from the prior art which use active surface deformation of a planar optical element, usually a mirror. They differ substantially in the location where forces are applied into the planar optical element. In some of these solutions, forces are applied to the peripheral surface of the planar optical element or in the edge region adjacent to the peripheral surface. In others, forces are applied along or near the central axis or the axis of symmetry, respectively, of the planar optical element.

Using a correction device in accordance with US 2012/0275041 A1, an imaging error of known evolution can be corrected within an optical instrument. For this purpose, a deformable mirror is introduced into the optical path of the arrangement, along which beams of electromagnetic radiation propagate. Forces are applied to the peripheral edge of the deformable mirror and introduced into the mirror such that the latter is deformed as a function of its contour as well as the location of force introduction and the vectors (amount, direction) of the forces introduced. The deformation of the mirror caused thereby and the resulting local change in the reflection behavior, as a consequence of optical path differences, enable correction of any wavefront errors occurring.

Specifically, the aforementioned US 2012/0275041 A1 proposes to select the contour of the mirror as a function of the imaging error to be corrected, e.g. round so as to correct the focus position, or elliptical so as to correct the focus position and astigmatism. Despite the same forces acting on the perimeter, this allows locally differing flexing moments to be applied to the surface, depending on the distance of the force application from the center of the mirror. It is proposed therein that, as a means of force application, an intermediate plate having the same contour as the mirror be connected to the peripheral edge of the mirror by a ring and that a force be introduced centrally into the intermediate plate, e.g. by means of a piezo actuator, said force then acting on the periphery of the mirror. In order to differentiate the force effect along the periphery of the mirror, it is proposed to design the intermediate plate differentially in thickness or/and to introduce the forces eccentrically into the intermediate plate. This solution allows different flexing moments to be generated in the mirror along the periphery. The ratio of the flexing moments with respect to each other is predetermined by the design of the contour of the mirror and is thus no longer variable.

U.S. Pat. No. 7,229,178 B1 discloses a deformable mirror whose circular or oval mirror plate can be bent parabolically via an internal (smaller) and an external (larger) annular support. For this purpose, the mirror is placed between the annular support. The required force is introduced by a mechanical actuating element. The actuating element acts directly or indirectly, via a lever, on the annular supports. Force introduction via the level and parallel annular supports is always effected centrally with respect to the axis of symmetry of the mirror. This merely allows the parameters of a paraboloid surface to be influenced. Again, no locally differentiated application of force is possible.

In a device known from DE 601 16 322 T2, aberrations are also compensated for by application of force onto a mirror. For the application of force, there are provided at least one active actuating element and two so-called force transmission rods. The force transmission rods each have their ends connected to the mirror via a respective deformation element, thereby applying the same force into the mirror at different points. A differentiated application of force at different points is not possible.

DE 196 28 672 C2 discloses a mirror comprising a deformable mirror plate held by its edge as well as comprising an actuating mechanism acting on the rear surface of the mirror plate, said actuating mechanism comprising a plurality of springs connected in parallel, which act on the rear surface of the mirror plate, and comprising an adjusting means for adjustment of the spring force. In this case, a force is applied into the center of the mirror and into eccentric points of action which are arranged in radially opposite pairs. The introduction of force can be adjusted only jointly for all points of action.

DE 42 36 355 C2 discloses an adaptive membrane mirror, comprising a round membrane clamped concentrically between two annular blades and comprising an actuator which is provided for axial displacement of the two annular blades relative to each other. A force introduced through the actuator is introduced on the rear surface of the membrane by one of the annular blades, while the annular blade contacting the membrane acts as a counter bearing. The adjustment travel of the actuator is converted directly into a bending travel by which the membrane between the two annular blades deviates from a planar surface. The device is limited to curving a mirror in rotation-symmetric manner. This results in a spherically curved mirror with a radius of curvature of greater than approximately one meter.

A likewise eccentric introduction of force into a mirror plate is known from EP 1 118 987 B1. Here, a translationally acting actuator acts on the mirror plate at eccentric positions behind the mirror surface, which positions are diametrically opposite one another with respect to the center of deformation. Due to the mirror plate being axially mounted, this eccentric force introduction—as opposed to the central force introduction—results in a leverage effect which, at the same axial stroke, leads to a stronger curvature with respect to the edge of the plate than the same stroke applied to the center of the mirror plate. This results in a less parabolic but rather more arc-shaped curvature of the mirror surface. The eccentric points of action of the actuator may be discretely staggered or arranged continuously along a track. The track need not be circular, but may also be oval, resulting in different radii of curvature.

DE 10 2014 208 984 A1 discloses an assembly comprising a support and an element which is adjustable and fixable with six degrees of freedom in said support, in particular a facet mirror for use in a micro-lithographic projection exposure system. The six degrees of freedom are ensured by three balls which are each supported between a concave ball segment surface formed on the support and a concave ball segment surface formed on the element. A potentially impinging beam can only be influenced here in terms of its deflection.

EP 0 710 551 B1 describes a device for producing a printing stencil, said device comprising focusing optics with at least one elastically deformable mirror diaphragm. Actuating means are provided which set a curvature of the mirror diaphragm as a function of an actuating signal. As for the actuating means, it is disclosed that they are preferably piezoelectric or magnetostrictive actuating means, which preferably act only on the central rear part of the mirror diaphragm or on an annular blade.

SUMMARY OF THE INVENTION

It is the object of the invention to find a device comprising a deformable, axially symmetric planar mirror to compensate for aberrations, said device allowing a locally differentiable and precise application of force into the planar mirror in the direction of the axis of symmetry of the planar mirror in an eccentrically offset manner with respect to the latter.

The object is achieved by a device as claimed in claim 1.

Advantageous embodiments are indicated in subclaims 2 to 8 which refer back to claim 1.

BRIEF DESCRIPTION OF THE DRAWINGS

The invention will be explained in more detail below with reference to exemplary embodiments and drawings. In the Figures.

DETAILED DESCRIPTION OF THE PREFERRED EMBODIMENTS

Figure 1A:
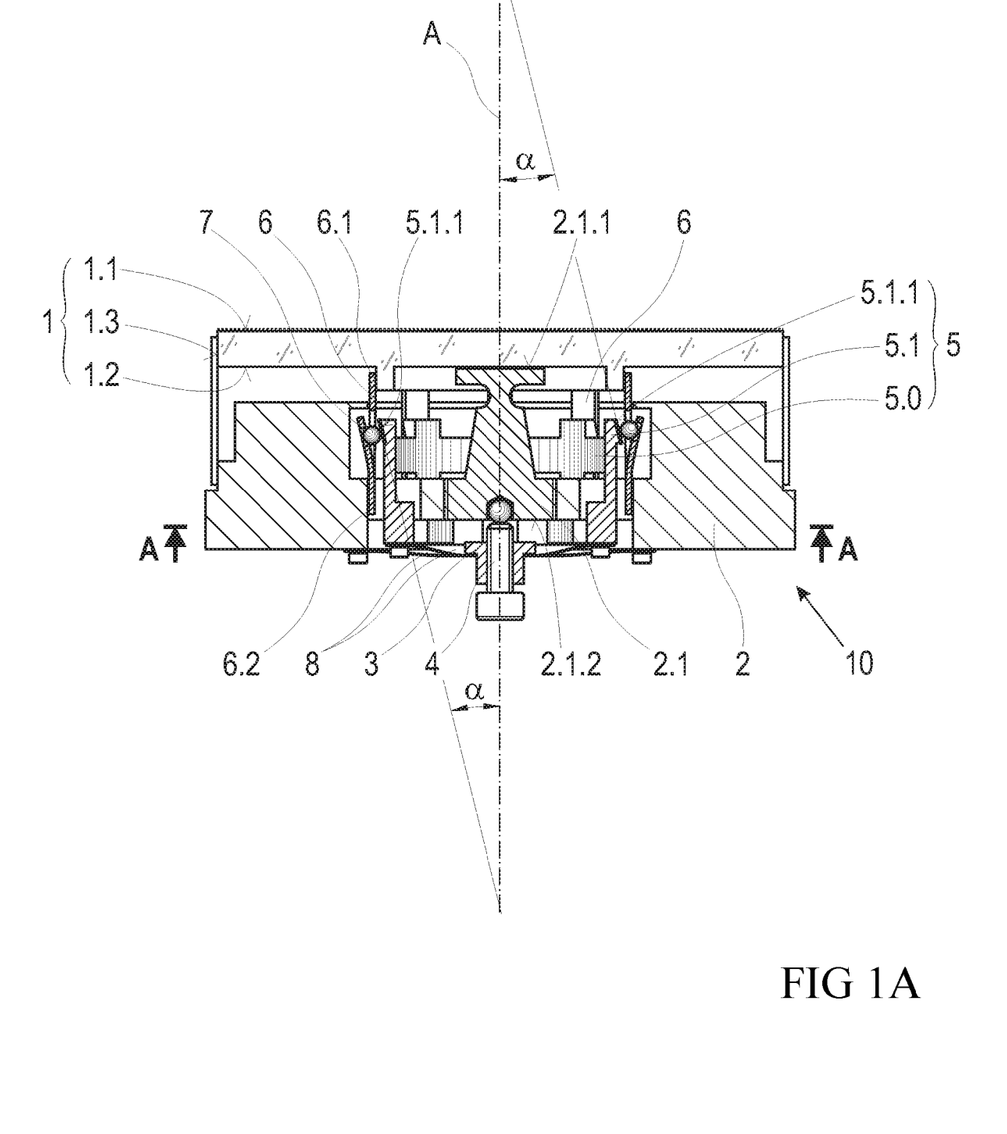
FIGS. 1A-1B: show a schematic diagram of a device.
Figure 1B:
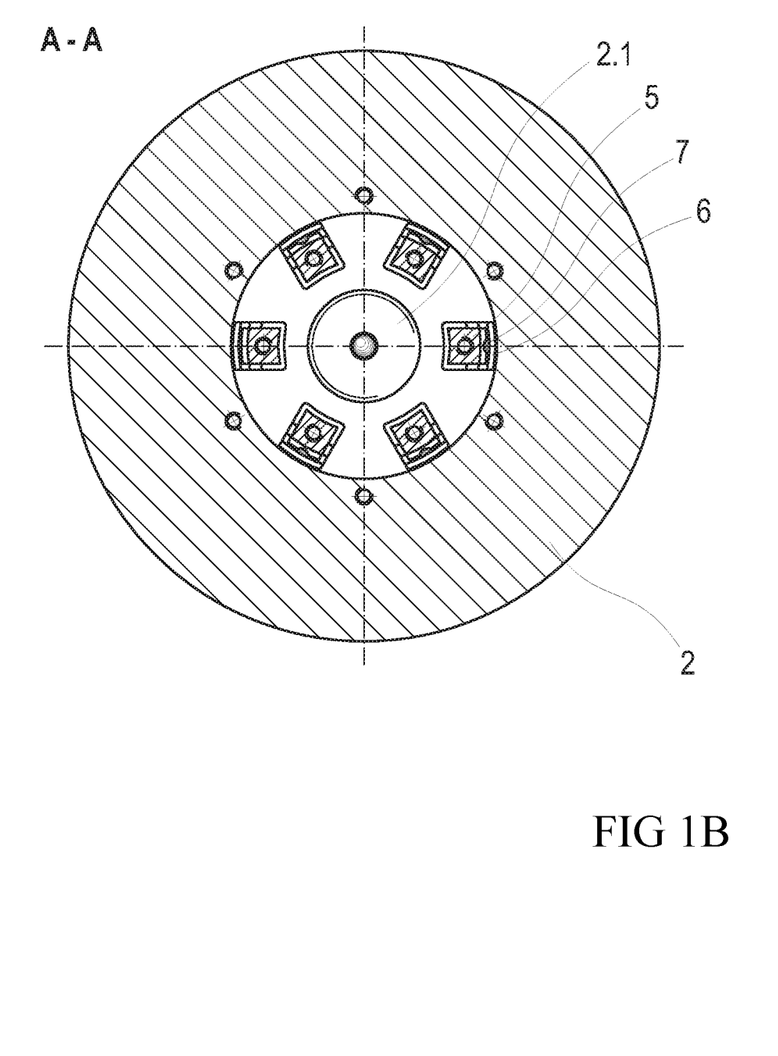

A first exemplary embodiment of a device according to the invention and its essential features are shown in FIGS. 1A-1B. Similar to prior art devices of this kind, it includes a planar mirror 1, which is actively deformed in order to influence the wavefront of an impinging beam. The planar mirror 1 has a mirror-coated front surface 1.1, a rear surface 1.2 and a peripheral surface 1.3 around an axis of symmetry A. Said planar mirror 1 may have a round, elliptical, square or other shape and comprise a peripheral surface 1.3 which is axially symmetric to the axis of symmetry A. For the sake of simplicity, the further description of the invention shall be based on a round planar mirror 1.

The device further includes an actuating and holding means 10, comprising a frame 2, a socket 3, a crown-like adjusting element 5, a membrane spring 8 and at least three elastic retaining lugs 6, each having one respective ball 7 assigned to it.

The frame 2 is firmly connected to the planar mirror 1 at the peripheral surface 1.3 of the latter. Said connection may be one connection established along the peripheral surface 1.3 or may be a plurality of single, discreet, in particular cohesive, connections. Thus, the planar mirror 1 is firmly held at its circumference. Centrally, the planar mirror 1 is supported by a prop 2.1, which is part of the frame 2, with the rear surface 1.2 contacting a first prop end 2.1.1 of the prop 2.1. The frame 2 may basically be a monolithic part with the prop 2.1 formed therein. In terms of manufacturing technology, however, it will be better to manufacture the frame 2 from one support part with the prop 2.1 permanently mounted therein.

The socket 3 is linearly adjustable along the axis of symmetry A in the frame 2 by means of an actuating element 4. The socket 3 is guided within the frame 2 by the membrane spring 8, which firmly encloses the socket 3 concentrically. The membrane spring 8 is segmented and comprises at least two first segments 8.1, which are firmly connected to the frame 2 via a respective first edge region 8.1.1, and at least two second segments 8.2, which are firmly connected to the crown-like adjusting element 5 via a respective second edge region 8.2.1 in each case.

Advantageous embodiments of the membrane spring 8 will be shown below with reference to FIGS. 2A-2C.

Figure 2A:
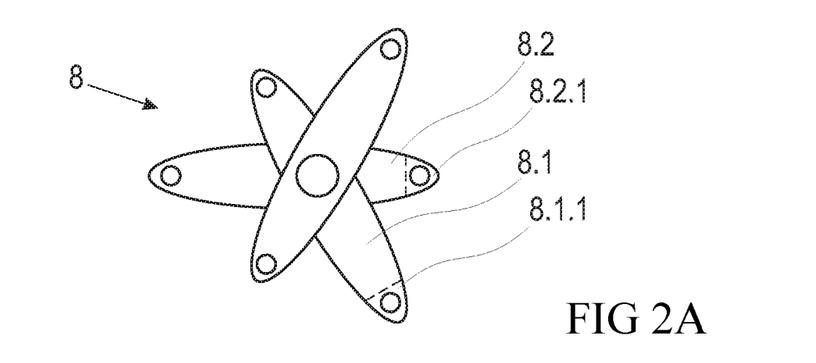
FIGS. 2A-2C: show different embodiments of the membrane spring.

FIG. 2A shows a segmented membrane spring 8, which is formed by a stack of identical strip membranes, which are arranged in a manner rotated with respect to each other. The ends of the strip membranes constitute the segments here. Said membrane spring 8 is easily adaptable to different numbers and arrangements of the crown spikes of different crown-like adjusting elements 5.

Figure 2B:
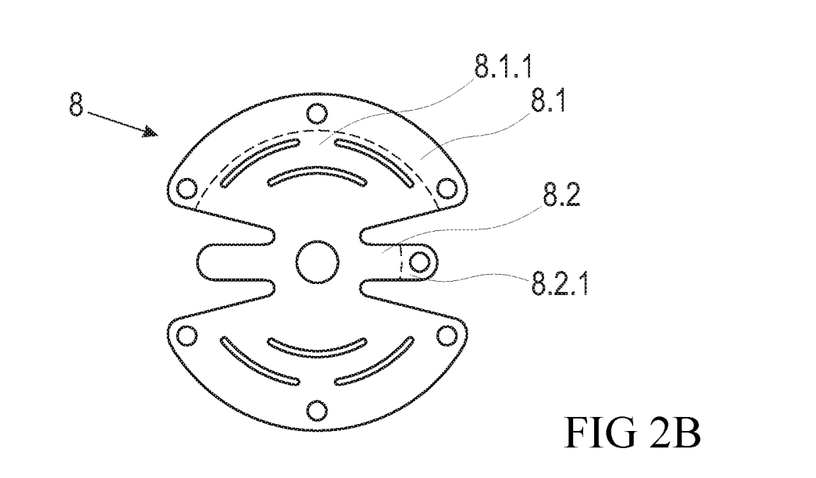
Figure 2C:
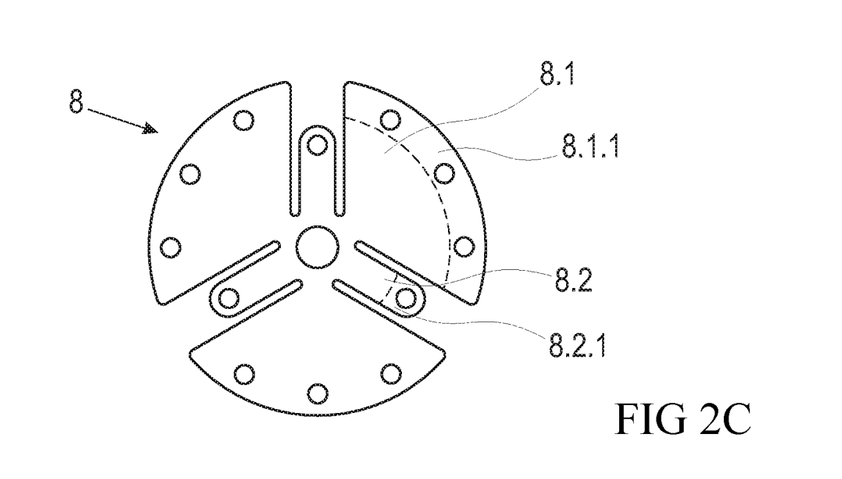

The segmented membrane spring 8 shown in FIG. 2B and FIG. 2C is formed by a single membrane comprising four or six segments 8.1, 8.2, respectively. Two groups of segments 8.1, 8.2 having different shapes make the membrane spring 8 torsion-resistant in different ways with respect to the connection to the crown spikes or to the frame 2, respectively, depending on the surface shape and size of the segments 8.1, 8.2. Advantageously, the larger segments with the higher torsion resistance are connected to the crown spikes and the smaller segments are connected to the frame 2.

The membrane spring 8 constitutes a spring guide for the socket 3, via which the socket 3 is guided within the frame 2 along the axis of symmetry A of the planar mirror 1 mounted in the frame 2, with the help of another sliding guide or membrane spring guide. At the same time, the linear movement of the socket 3 is transmitted to the crown-like adjusting element 5 via the membrane spring 8. The crown-like adjusting element 5 comprises at least three crown spikes which are connected to each other via a circlet 5.0. Advantageously, the crown-like adjusting element 5 constitutes a monolithic part. The crown spikes are either at least a first crown spike 5.1 with a contact surface 5.1.1 inclined with respect to the axis of symmetry A and at least a second crown spike 5.2 with a contact surface 5.2.1 that is parallel to the axis of symmetry A, or all crown spikes constitute first crown spikes 5.1, each having a contact surface 5.1.1 that is inclined with respect to the axis of symmetry A. The circlet 5.0 connects the crown spikes to each other, preferably at one height or near the first or second contact surfaces 5.1.1, 5.2.1.

In the sectional view shown in FIG. 1A, two first crown spikes 5.1 are shown, by way of example, whose inclined contact surfaces 5.1.1, opposite the planar mirror 1, each enclose a same angle of inclination α with the axis of symmetry A.

The inclined contact surfaces 5.1.1 of the first crown spikes 5.1 may generally have an angle of inclination (α) with a same or a different angle value. The angles of inclination α may all be arranged in front of the front surface 1.1 or all be arranged behind the rear surface 1.2 of the planar mirror 1 or, as shown for two first crown spikes 5.1 in FIG. 1a, one of the angles of inclination α may be arranged in front of the front surface 1.1 and one of the angles of inclination α may be arranged behind the rear surface 1.2 of the planar mirror 1. This allows forces differing in their amount and direction to be applied, while otherwise maintaining the same dimensions of the device at the connections of the retaining lugs 6 with the rear surface 1.2 of the planar mirror 1, so as to effect a desired deformation of the planar mirror 1.

Advantageously, the inclined contact surfaces 5.1.1 of crown spikes, which are symmetrically opposed with respect to the axis of symmetry A, enclose a same angle of inclination α with the axis of symmetry A and are all either arranged in front of the front surface 1.1 or behind the rear surface 1.2 of the planar mirror 1, thereby applying forces having the same amount and the same direction.

Figure 3A:
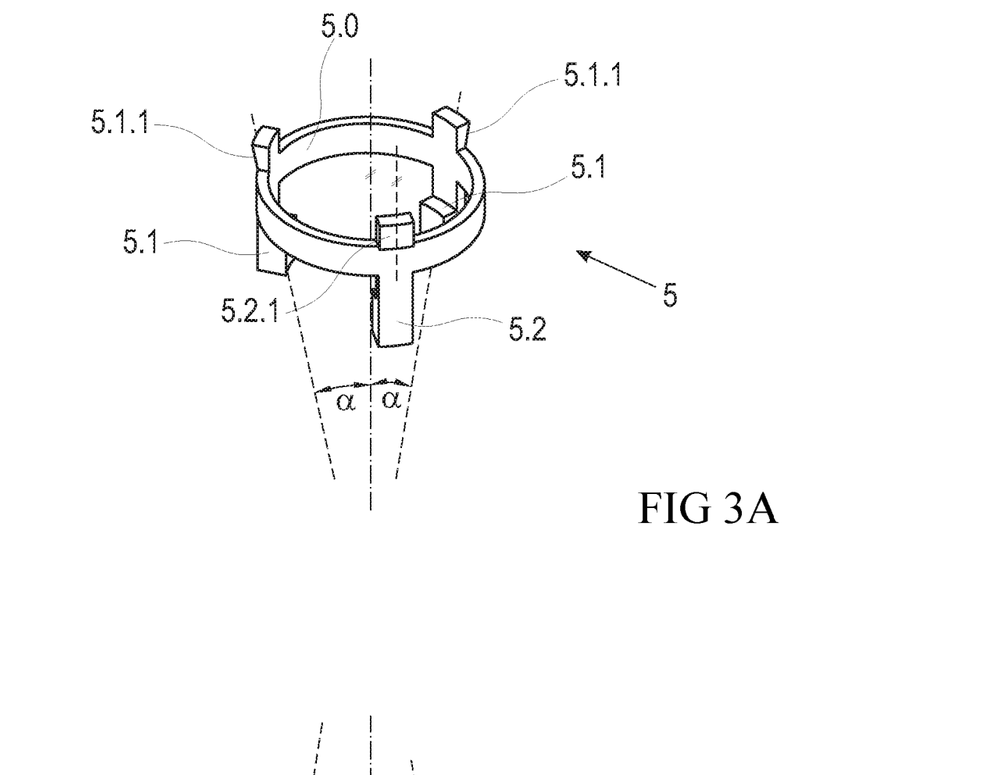
FIGS. 3A-3B: show different embodiments of the crown-like adjusting element.

By way of example, FIG. 3A shows a crown-like adjusting element 5 comprising a second crown spike 5.2, which has a parallel contact surface 5.2.1, and two first crown spikes 5.1, each having an inclined contact surface 5.1.1 with the angle of inclination α behind the rear surface 1.2 of the planar mirror 1.

Figure 3B:
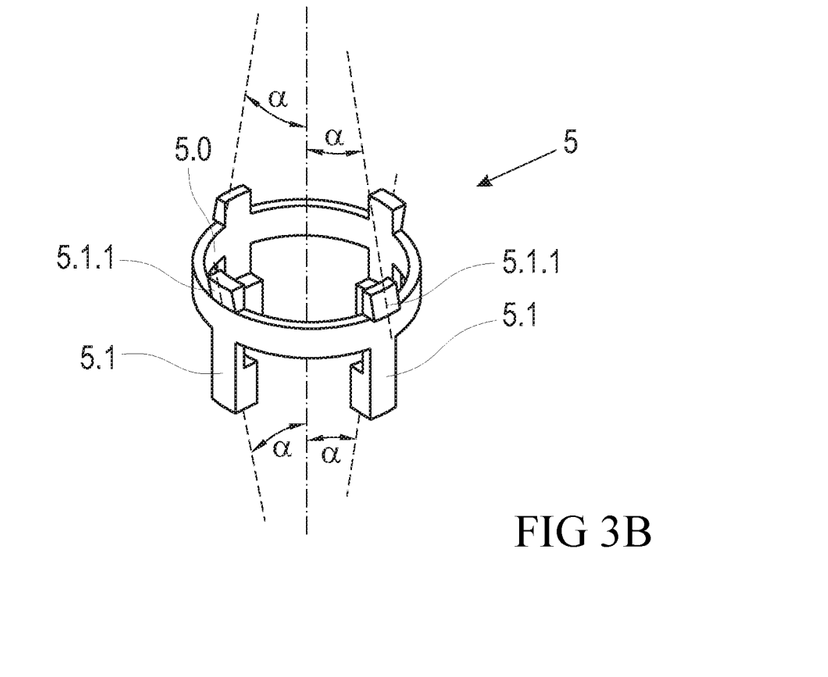

FIG. 3B shows a crown-like adjusting element 5 comprising four first crown spikes 5.1. The first crown spikes 5.1, which are arranged symmetrically with respect to the axis of symmetry A in opposite pairs, respectively enclose an angle of inclination α of the same angle value with the axis of symmetry A, with the inclined contact surfaces 5.1.1 of one pair of first crown spikes 5.1 enclosing the angle of inclination α with the axis of symmetry A in front of the front surface of the planar mirror 1 and those of the other pair of first crown spikes 5.1 enclosing the angle of inclination α with the axis of symmetry A behind the rear surface 1.2 of the planar mirror 1.

The crown-like adjusting element 5 is guided within the frame 2, on the one hand, by the membrane spring 8 and, on the other hand, by the indirect contact of the crown spikes with the elastic retaining lugs 6, which are each firmly connected, respectively, to the rear surface 1.2 of the planar mirror 1 by a first lug end 6.1 and to the frame 2 by a second lug end 6.2.

For this purpose, there are connection points on the rear surface 1.2 of the planar mirror 1 in an arrangement envisaged to correspond to the retaining lugs 6, with small individual mounting blocks advantageously attached to or formed at the connection points. The elastic retaining lugs 6 each have a longitudinal axis 6.0 which is parallel to the axis of symmetry A in the stress-free state of the retaining lugs 6, and they are each in indirect contact with a respective one of the inclined contact surfaces 5.2.1 or a respective one of the parallel contact surfaces 5.2.1 via a ball 7. The retaining lugs 6 are mounted stress-free or pre-stressed.

When all retaining lugs 6 are mounted stress-free, an application of force can only be effected by increasing the stress on the retaining lugs 6 and thus increasingly shortening the perpendicular distance between the first and second lug ends 6.1, 6.2 in the direction of the axis of symmetry A, so that any forces applied all act in the same direction. Different amounts of the forces can be produced by differently dimensioning the retaining lugs 6.

When all retaining lugs 6 are mounted in a pre-stressed manner, an application of force can be effected either by increasing or by decreasing the stress on the retaining lugs 6 and thus in the opposite direction, respectively by increasingly relaxing the retaining lugs 6, thereby increasing the perpendicular distance between the first and second lug ends 6.1, 6.2 in the direction of the axis of symmetry A, or by increasingly stressing them, as already explained.

During linear adjustment of the crown-like adjusting element 5, the contact surfaces 5.1.1, 5.2.1 of the crown spikes slide on the balls 7. In this case, a second crown spike 5.2 with a parallel contact surface 5.2.1 is merely guided along one of the retaining lugs 6, thereby merely rolling off the ball 7 assigned to it, while the retaining lug 6 remains in its stressed state. On the other hand, a first crown spike 5.1 with an inclined contact surface 5.1.1 will displace the ball 7 radially to the retaining lug 6, as a function of the angle of inclination α of the inclined contact surface 5.1.1 with respect to the axis of symmetry A, thereby changing the stressed state of the retaining lug 6. Depending on the direction of the displacement, a pre-stressed retaining lug 6 will be relaxed or stressed increasingly, or a stress-free retaining lug 6 will be increasingly stressed, respectively.

If all inclined contact surfaces 5.1.1 on a side opposite the planar mirror 1 each enclose an angle of inclination c with the axis of symmetry A that has the same angle value, then the retaining lugs 6 are stressed or relaxed, respectively, to the same extent, provided they are all dimensioned identically. The forces respectively applied via one of the retaining lugs 6 into the rear surface 1.2 of the planar mirror 1 then have an identical amount and an identical direction. Advantageously, the inclined contact surfaces 5.1.1 of symmetrically opposed first crown spikes 5.1 have an identical angle of inclination α with respect to the axis of symmetry A.

Due to the crown-like adjusting element 5 having first crown spikes 5.1 with inclined contact surfaces 5.1.1 having angles of inclination α, at least some of which are arranged in front of the front surface 1.1 of the planar mirror 1, while the others are arranged behind the rear surface 1.2 of the planar mirror 1, forces are applied in opposite directions via the respectively assigned retaining lugs 6. In a linear movement of the crown-like adjusting element 5, the ball 7 is thereby pushed toward the one first crown spike 5.1 radially toward the axis of symmetry A and pushed toward the other first crown spike 5.1 radially away from the axis of symmetry A. Accordingly, the state of deformation of the respectively assigned retaining lug 6 will be changed in that the latter is either stressed or relaxed to an increasing extent.

In order to hold each of the balls 7 in the same relative position to the retaining lug 6 and to leave the latter only a translational degree of freedom in a radial direction, the balls 7 are held, for example, in a cage arranged in a fixed relation to the frame 2 or are advantageously held in the retaining lug 6 itself, e.g. in a recess. Advantageous embodiments of the retaining lug 6 are shown in FIGS. 4A-4B.

Figure 4A:
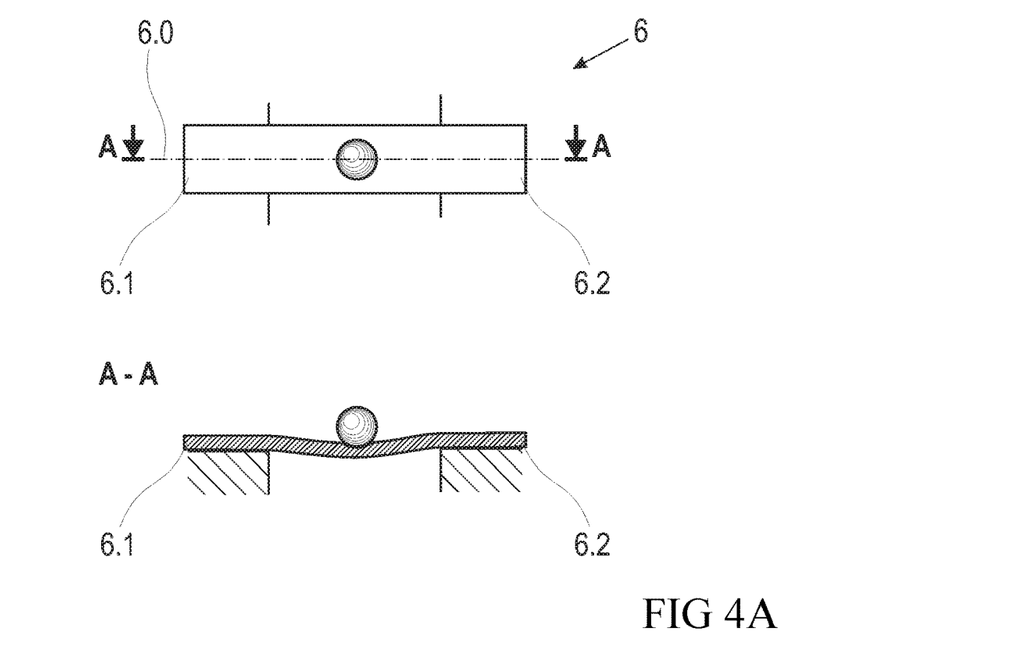
FIGS. 4A-4B: show different embodiments of the retaining lugs.

Generally, conventional leaf springs, e.g. as shown in FIG. 4A, with a constant rectangular cross-section over their length, may be used as retaining lugs 6. However, the retaining lugs 6 may also have other cross-sections over their length, for instance varying in thickness or width along their length.

Figure 4B:
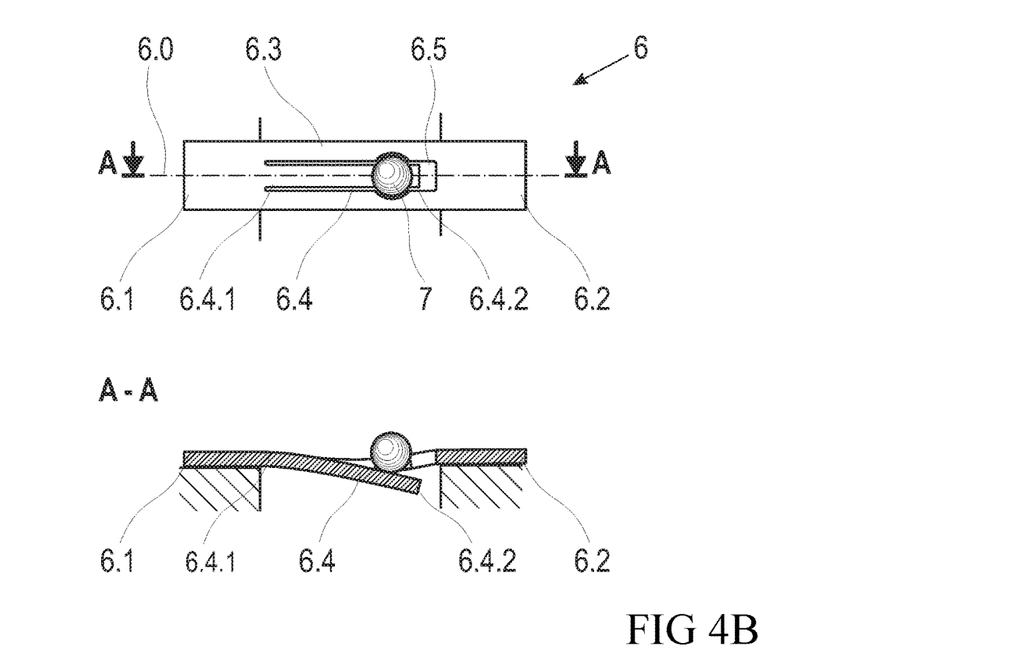

A retaining lug 6 as shown in FIG. 4B is used as particularly advantageous. This retaining lug 6 is divided by cutouts 6.5 into a leaf spring frame 6.3 and a framed leaf spring tongue 6.4. The ball 7 then contacts the leaf spring tongue 6.4 and is advantageously supported with some play in the leaf spring frame 6.3. Advantageously, the leaf spring frame 6.3 and the leaf spring tongue 6.4 are symmetrical with respect to the longitudinal axis 6.0.

The first lug end 6.1 and the second lug end 6.2 of the retaining lug 6 are formed on the leaf spring frame 6.3. The leaf spring tongue 6.4 is monolithically connected to the leaf spring frame 6.3 by a fixed tongue end 6.4.1, which faces the first lug end 6.1 and is spaced apart from the latter. On the opposite side, the leaf spring tongue 6.4 has a free tongue end 6.4.2, which faces the second lug end 6.2 of the retaining lug 6. The ball 7 contacts the leaf spring tongue 6.4 near the free tongue end 6.4.2. The nested design of the leaf spring tongue 6.4 within the leaf spring frame 6.3 has the particular advantage for this embodiment of the retaining lug 6 that a desired transmission ratio between the applied adjustment travel via the ball 7 or a correspondingly introduced force, respectively, and the force acting on the planar mirror 1 can be adjusted without having to adapt the external dimensions of the retaining lug 6 for this purpose. The cutout 6.5 in the leaf spring frame 6.3, resulting from cutting out the leaf spring tongue 6.4, is enlarged such that the ball 7 contacts the leaf spring tongue 6.4 through the leaf spring frame 6.3—and does so in any state of stress set via the device. Depending on the state of stress, however, the play of the ball 7 will vary within the leaf spring frame 6.3, so that the ball 7, in addition to the translational degree of freedom in a radial direction, may also perform a limited translational movement in an axial direction, so that the lever of the force acting on the leaf spring tongue 6.4 may change. In order to avoid this, the balls 7 are advantageously supported, even in such an embodiment of the retaining lug 6, in a cage which is fixed with respect to the frame 2.

The linear movement of the socket 3 may be effected, for example, by an actuating element 4 screwed into the socket 3, said actuating element 4 advantageously acting indirectly on a second prop end 2.1.2 as shown in FIG. 1A. By screwing the actuating element 4 in against the second prop end 2.1.2, which is fixed with respect to the frame 2, the socket 3 is pulled toward the head of the actuating element 4, and vice versa, thereby linearly adjusting the actuating element 4 within the frame 2.

Alternatively, the socket 3 may be linearly displaced by the direct action of one or more piezo elements or lifting magnets or via further lever or traction drives (pull wire).

LIST OF REFERENCE NUMERALS

1 planar mirror
1.1 front surface
1.2 rear surface
1.3 peripheral surface
2 frame
2.1 prop
2.1.1 first prop end
2.1.2 second prop end
3 socket
4 actuating element
5 crown-like adjusting element
5.0 circlet
5.1 first crown spike
5.1.1 inclined contact surface
5.2 second crown spike
5.2.1 parallel contact surface
6 retaining lug
6.0 longitudinal axis
6.1 first lug end
6.2 second lug end
6.3 leaf spring frame
6.4 leaf spring tongue
6.4.1 fixed tongue end
6.4.2 free tongue end
6.5 cutout
7 ball
8 membrane spring
8.1 first segment
8.1.1 first edge region
8.2 second segment
8.2.1 second edge region
10 actuating and holding means
A axis of symmetry
α angle of inclination

What is claimed is:

1. A device for variably influencing a wavefront of a beam, the device comprising:
   an axially symmetric planar mirror comprising a mirror-coated front surface, a rear surface, a peripheral surface around an axis of symmetry (A), and an actuating and holding means;
   the actuating and holding means comprising a frame to which the planar mirror is firmly attached at the peripheral surface, and a prop associated with the frame, said prop having a first prop end centrally contacting the rear surface of the planar mirror;
   a socket linearly adjustable along the axis of symmetry (A) in the frame by means of an actuating element;
   the actuating and holding means comprising a crown-like adjusting element being guided along the axis of symmetry (A) in the frame and comprising at least three crown spikes and a circlet connecting the at least three crown spikes, wherein the crown spikes either constitute at least a first crown spike with an inclined contact surface inclined with respect to the axis of symmetry (A) and at least a second crown spike with a parallel contact surface that is parallel to the axis of symmetry (A), or all crown spikes constitute first crown spikes, each having the inclined contact surface inclined with respect to the axis of symmetry (A);
   at least three elastic retaining lugs, each of the at least three elastic retaining lugs having a first lug end firmly connected to the rear surface of the planar mirror, and a second lug end firmly connected to the frame, wherein the at least three elastic retaining lugs each have a longitudinal axis parallel to the axis of symmetry (A), and the at least three elastic retaining lugs are each in indirect contact with a respective one of the inclined contact surface or a respective one of the parallel contact surfaces via a ball; and
   the socket being firmly enclosed by a segmented membrane spring comprising at least two first segments firmly connected to the frame via a respective first edge region, and at least two second segments firmly connected to the crown-like adjusting element via a respective second edge region.

2. The device according to claim 1, wherein the inclined contact surfaces of the first crown spikes all form an angle of inclination (α) with a same or different angle value with the axis of symmetry (A) either in front of the front surface of the planar mirror or behind the rear surface of the planar mirror.

3. The device according to claim 2, wherein at least two of the first crown spikes are arranged symmetrically opposite each other with respect to the axis of symmetry (A) and the angles of inclination (α) have a same angle value.

4. The device according to claim 1, wherein a plurality of the inclined contact surfaces of the first crown spikes form an angle of inclination (α) with a same or different angle value with the axis of symmetry (A) in front of the front surface of the planar mirror and remaining of the inclined contact surfaces of the first crown spikes form an angle of inclination (α) with a same or different angle value with the axis of symmetry (A) behind the rear surface of the planar mirror.

5. The device according to claim 4, wherein at least two of the first crown spikes are arranged symmetrically opposite each other with respect to the axis of symmetry (A) and the angles of inclination (α) have a same angle value.

6. The device according to claim 1, wherein the balls are each supported in one of the retaining lugs.

7. The device according to claim 1, wherein the balls are each supported in a recess in one of the retaining lugs.

8. The device according to claim 1, wherein the retaining lugs are each divided by a cutout into a leaf spring frame and a framed leaf spring tongue, wherein the leaf spring tongue is monolithically connected to the leaf spring frame via a fixed tongue end, and wherein the ball contacts the leaf spring tongue.

9. The device according to claim 8, wherein the ball is supported in the leaf spring frame.

\* \* \* \* \*